United States Patent
Tarnanen et al.

(10) Patent No.: US 6,834,196 B1
(45) Date of Patent: Dec. 21, 2004

(54) METHOD FOR IMPROVING THE PERFORMANCE OF USSD TRANSFER IN A CELLULAR COMMUNICATIONS SYSTEM

(75) Inventors: Teemu Tarnanen, Espoo (FI); Sami Yliharjii, Helsinki (FI)

(73) Assignee: Nokia Networks Oy, Espoo (FI)

(*) Notice: Subject to any disclaimer, the term of this patent is extended or adjusted under 35 U.S.C. 154(b) by 0 days.

(21) Appl. No.: 09/744,674

(22) PCT Filed: Aug. 3, 1999

(86) PCT No.: PCT/FI99/00649

§ 371 (c)(1),
(2), (4) Date: Jan. 29, 2001

(87) PCT Pub. No.: WO00/08885

PCT Pub. Date: Feb. 17, 2000

(30) Foreign Application Priority Data

Aug. 3, 1998 (FI) .................................................. 981692

(51) Int. Cl.[7] .............................................. H04Q 7/20
(52) U.S. Cl. .................... 455/466; 455/414.1; 455/417; 379/201.12
(58) Field of Search .............................. 455/466, 414.1, 455/445, 446, 417, 517; 379/201.01, 201.12, 201.07, 201.08; 370/310.2, 335, 229, 310, 231

(56) References Cited

U.S. PATENT DOCUMENTS

| 5,442,809 | A | | 8/1995 | Diaz et al. | |
|---|---|---|---|---|---|
| 5,835,856 | A | * | 11/1998 | Patel | 455/406 |
| 5,966,653 | A | * | 10/1999 | Joensuu et al. | 455/466 |
| 6,044,263 | A | * | 3/2000 | Valentine et al. | 455/414 |
| 6,052,591 | A | * | 4/2000 | Bhatia | 455/445 |
| 6,335,922 | B1 | * | 1/2002 | Tiedemann et al. | 370/335 |
| 6,449,356 | B1 | * | 9/2002 | Dezonno | 379/265.01 |
| 6,459,680 | B1 | * | 10/2002 | Alperovich et al. | 370/230 |

FOREIGN PATENT DOCUMENTS

| EP | 0 840 531 | 7/1999 |
|---|---|---|
| GB | 2 301 749 | 12/1996 |
| WO | WO 93/10600 | 5/1993 |
| WO | WO 97/29597 | 8/1997 |
| WO | WO 99/20069 | 4/1999 |

OTHER PUBLICATIONS

Mouly Michel et al, "The GSM System for mobile communication", 1992, p. 190–p. 191.

* cited by examiner

Primary Examiner—William Trost
Assistant Examiner—Stephen M. D'Agosta
(74) Attorney, Agent, or Firm—Pillsbury Winthrop LLP

(57) ABSTRACT

In the GSM and similar systems, USSD (Unstructured Supplementary Service Data) transfer takes place on a fast channel if a mobile station is involved in that call, and otherwise on a slow channel. The USSD transfer can be switched to the fast channel by determining the amount of data to be transmitted. If the amount of data to be transmitted is likely to exceed a predetermined threshold, and if the mobile station is not involved in a call, a call attempt is initiated for switching the USSD transfer to the fast channel.

5 Claims, 1 Drawing Sheet

METHOD FOR IMPROVING THE PERFORMANCE OF USSD TRANSFER IN A CELLULAR COMMUNICATIONS SYSTEM

BACKGROUND OF THE INVENTION

The invention relates to improving the performance of USSD (Unstructured Supplementary Service Data) transfer in a cellular communications system, such as GSM (Global System for Mobile Communication).

The user of a mobile station (MS) can use USSD to give instructions to the supporting PLMN (Public Land based Mobile Network). For example, incoming calls can be routed to number 123456 by dialling *21*#123456#. USSD is also one of the mechanisms for implementing new services. USSD allows an MS and a service application to communicate with each other by character strings, in a way which is transparent to the MS and to the intermediate network elements. USSD can be used as a narrow-band bearer for over-the-air (OTA) and value-added services (VAS) applications. With respect to a more detailed description of the USSD, reference is made to the following ETSI GSM recommendations: GSM 02.90: European digital cellular telecommunications system (Phase 2); Stage 1 description of Unstructured Supplementary Service Data (USSD), GSM 03.90: Digital cellular telecommunications system (Phase 2); Unstructured Supplementary Service Data (USSD)—Stage 2, and GSM 04.90: European digital cellular telecommunications system (Phase 2); Unstructured Supplementary Service Data (USSD)—Stage 3. USSD requests, notifications and responses contain a USSD string, an alphabet indicator and a language indicator, as defined in GSM 03.38.

USSD signalling may be initiated by the mobile station or by the network. Phase 1 supports only MS-initiated USSD. Network-initiated USSD service requires that all parts of the mobile communications system be at least phase 2 systems. The mobile communications network may at any time send a USSD message to a mobile station MS registered with the network in order to transmit information to the subscriber. This operation may be either a request (asking the MS to provide information) or a notification (requiring no information to be provided by the MS). No prior provisioning of USSD is required, although provisioning of services which make use of USSD may be required.

According to the above ETSI recommendations, USSD signalling takes place between an MS and an MSC/VLR (Mobile services Switching Centre/Visitor Location Register) or HLR (Home Location Register). USSD supports a maximum of 160 bytes of usher data per message. (The upper limit can be less than 160 bytes depending on the underlying protocol layers.) Unlike SMS (Short Message Service), USSD has no store-and-forward functionality: mobile-terminated USSD messages are delivered to the MS immediately, or the delivery fails (e.g. because the MS is unreachable).

For the purposes of this application, a GSM-type mobile station has two modes: a call mode and an idle mode. A mobile station is in call mode if and only if it is "in a call", which state is defined in the GSM recommendation 02.30.

According to the above ETSI recommendations, USSO transfer takes place on two different channels depending on whether or not the MS is in call mode or idle mode. In call modes, Fast Associated Control Channel (FACCH) is used. In idle mode, Slow Dedicated Control Channel (SDCCH) is used.

The speed of the FACCH channel is approximately 140 bytes per second and that of the SDCCH channel approximately 83 bytes per second. Thus, even in idle mode, any USSD message can be delivered in less than two seconds.

It is conceivable that the use of USSD for implementing value-added and over-the-air services will increase. In this case, especially if multiple consecutive USSD messages are needed, the slow transfer speed off the SDCCH channel could be seen as a problem. (It should be noted that for keeping the description compact, FACCH is used as a synonym for the fast channel, and SDCCH is used as a synonym for the slow channel. However, FACCH and SDCCH are terms used in the GSM system and its derivatives, but these terms are not necessarily used in future cellular systems.)

BRIEF SUMMARY OF THE INVENTION

Accordingly, it is an object of the present invention to study whether the speed of USSO in idle mode can be improved, and if yes, to provide a method and equipment for improving the speed of USSD in idle mode. The object is achieved with a method and equipment which are characterized by what is disclosed in the attached independent claims. Preferred embodiments are disclosed in the attached dependent claims.

A straightforward way of improving the speed of USSD transfer would be to specify that all USSD traffic takes place on the fast FACCH channel. This would, however, require changes in existing standardisation. Also, FACCH is not a dedicated channel, but an associated one, which means that it is implemented by stealing bits from the speech channel, if one exists. If such bit stealing is allowed to go on for long periods of time, it will degrade speech quality to some extent.

The invention is based on locating the problem and finding a solution for it. The solution is based on the idea that the amount of USSD data is determined, and if the amount exceeds (or is likely to exceed) a predetermined threshold (i.e. for lengthy USSD transmissions), the faster FACCH channel is activated by directing the MS into call mode. A simple way of accomplishing this is performing an unsuccessful call attempt.

Thus it can also be said that the invention is based on a novel interpretation of call mode, as specified in the above-referenced GSM recommendation 02.30, wherein call mode is defined as follows: A mobile station is in a call from the time that signalling related to the establishment or attempted establishment of a mobile originated or mobile terminated call commences, and before the call or call attempt ends, and (if applicable), the mobile equipment has stopped generating tones related to this call to the user. Fooling the MS into call mode (by performing an unsuccessful call attempt) activates the faster FACCH channel for USSD transfer. However, it should be noted that the mobile station is "in a call" as defined by ETSI GSM 02.30, whereby the invention requires no deviations from existing standards. Thus the method and equipment according to the invention solve the problem of the prior art USSD transfer in an elegant manner.

The invention is also based on determining the amount of USSD data (i.e. the length of USSD transmission) and using the FACCH channel only for lengthy USSD transmissions. Performing an unsuccessful call attempt for short USSD transmissions would create unnecessary signalling load, which is especially harmful at the air interface. This signalling load must be balanced against the savings in time brought about by the mechanism of the invention. For example, FACCH could be used only if using i saves at least one second. Because FACCH transfer is approximately 1.7 times faster than SDCCH transfer, it saves about 40% of the time needed by the SDCCH transfer. If it is required that at least one second must be saved, a minimum length for a USSD message would be 250 bytes. This exceeds the length of a single USSD message. In other words, performing the unsuccessful call attempt is useful only with multiple consecutive USSD messages (assuming 83 and 140 bytes per second for SDCCH and FACCH, respectively, and a minimum saving of one second). Of course, it must be remembered that initiating the unsuccessful call attempt wastes a fraction of a second. Thus the logic for initiating the unsuccessful call attempt should be placed at the top of the protocol stack, i.e. in the application layer. Otherwise the logic will not know that multiple USSD messages are needed.

BRIEF DESCRIPTION OF THE SEVERAL VIEWS OF THE DRAWING

The method and the equipment according to the invention will be described in more detail by means of preferred embodiment with reference to the appended drawing on which.

DETAILED DESCRIPTION OF INVENTION

Figure 1:
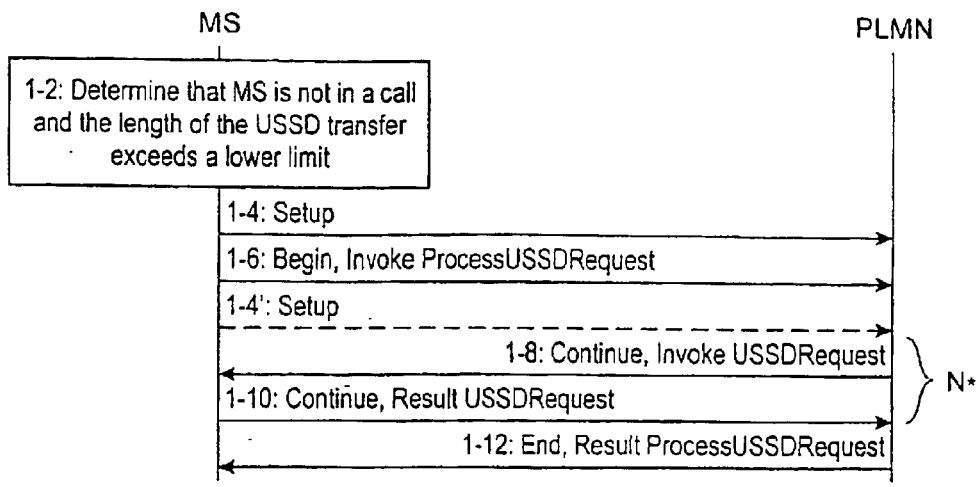
FIG. 1 is a signalling diagram illustrating mobile-originated USSD transfer.

FIG. 1 is a signalling diagram illustrating mobile originated USSD transfer. Time advances from top to bottom. A USSD dialogue between two parties will be described. One of the parties is a mobile station MS and the other is a part or an element of a public land based mobile network PLMN serving that MS. The MS can be a small handportable cellular radio telephone but the invention is best utilised if the mobile station comprises or is associated with data processing equipment. An example of such a mobile station is Nokia Communicator 9000. Another example is a general-purpose portable computer connected with a Nokia Cella Datacard to a cellular radio telephone with a suitable interface, such as Nokia 2110 or 8110. All Nokia equipment is available from Nokia Mobile Phones, Finland.

In step 1-2 a mobile station MS in idle mode determines that the length of the USSD transfer exceeds a predetermined threshold, which could be approximately 250 bytes. In step 1-4 the MS initiates a call attempt that ultimately should fail. One way of achieving this is calling a non-existent number. Alternatively, the MS could call itself. (At some later stage, the network PLMN will reply that the called subscriber does not answer, but this reply is not significant for understanding the invention.) Steps 1-6 through 1-12 constitute a mobil-originated USSD dialogue which know per se. In step 1-6 the MS initiates the USSD dialogue by sending a BEGIN, INVOKE PROCESSUSSD-REQUEST message to the network. (The primed message 1-4' will be explained later.) In step 1-8 the network responds with a CONTINUE, INVOKEUSSD-REQUEST message. In step 1-10 the MS sends a CONTINUE, RESULT USSDREQUEST message. The symbol "N*" indicates that the dialogue can comprise multiple pairs of messages 1-8 and 1-10. Finally, in step 1-12, the USSD dialogue is terminated by an END, RESULT PROCESSUSSDREQUEST message from the network.

The primed message 1-4' relates to an alternative embodiment of the mobile-originated USSD transfer according to the invention, wherein the call attempt 1-4 is not performed before message 1-6 but only after it. In this case, the call attempt is shown with reference number 1-4'. In other words, it is also possible for a mobile station to initiate the USSD dialogue in step 1-6 before performing the call attempt in step 1-4'. Thus steps 1-4' and 1-6 are not performed in numerical order.

The lower limit for activating the FACCH channel can be fixed, e.g. approximately 250 bytes (which corresponds to a saving of one second over SDCCH). Alternatively, the lower limit can be an adjustable network parameter which the network distributes by some suitable means, such as broadcasting, short message service, multipoint transmission (in packet radio networks), etc.

Figure 2:
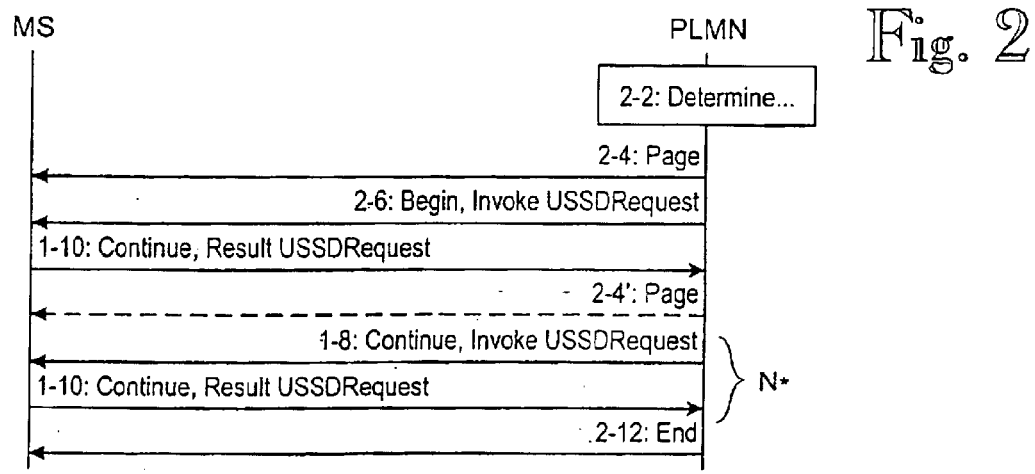
FIGS. 2 and 3 are signalling diagrams illustrating network-originated USSD transfer.

FIG. 2 is a signalling diagram illustrating a simple embodiment of a network-originated USSD transfer according to the invention. Messages with identical reference numbers to those in FIG. 1 have identical function and will not be described again. Step 2-2 corresponds to step 1-2 but in this case, the network determines that the mobile station MS is in idle mode and the length of the USSD transfer justifies the use of the faster FACCH channel (i.e. exceeds a lower limit). In step 2-4 the network initiates a call attempt. However, unlike step 1-4 shown in FIG. 1, the network cannot call a non-existent number (obviously, because the MS would not be alerted). Instead, the network can send to the MS a PAGE message in step 2-4. Steps 2-6 through 2-12 constitute a network-originated USSD dialogue which is known per se. In step 2-6 the network initiates the USSD dialogue by sending a BEGIN, INVOKE USSDREQUEST message to the MS. The primed message 2-4' relates to an alternative embodiment wherein the PAGE message is sent after the message 2-6, like the alternative setup message 1-4' in FIG. 1. Messages 1-8 and 1-10 have already been explained. In step 2-12, the USSD dialogue is terminated by an END message.

Figure 3:
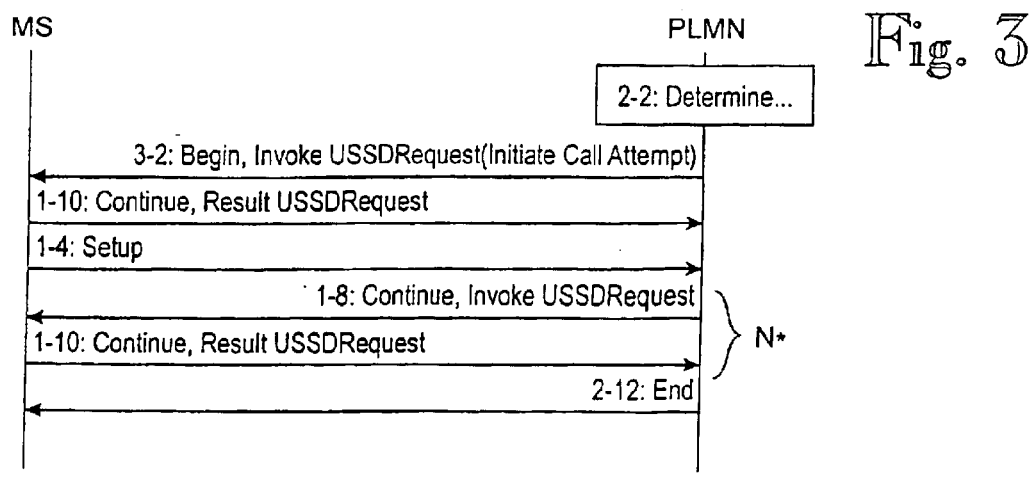

FIG. 3 is a signalling diagram illustrating a preferred embodiment of a network-originated USSD transfer according to the invention. The simple embodiment shown in FIG. 2 has the problem of confusing the user of the MS by the unsuccessful call attempt. The preferred embodiment shown in FIG. 3 eliminates this problem by converting a network-originated call attempt to a mobile originated one. In step 3-2 the network PLMN sends to the MS an indication that the MS must initiate a call setup procedure for activating the FACCH channel. This indication can be embedded, for example, inside a protocol-specific header or parameter in an appropriate WAP (Wireless Application Protocol) layer. In the embodiment shown in FIG. 3, this indication has been embedded in the BEGIN, INVOKE USSDREQUEST message which was shown as step 2-6 in FIG. 2. In step 1-4 the MS initiates the unsuccessful call attempt by sending a SETUP message. The remainder of the procedure is similar to the one described in connection with FIG. 2.

The preferred embodiment of the network-originated USSD transfer has several advantages over the simple embodiment. For example, no special call setup routines are required in the network. Also, because the MS does not have to be paged, call setup is faster and the user of the MS is not alerted.

The invention requires neither hardware changes nor changes to existing GSM standards. The invention can be implemented as software routines in a mobile station and/or the Public Land based Mobile Network PLMN. In the mobile station, the software routine can be installed in the cellular telephone proper, or in the associated computer, if any. Installing the software routine in the associated computer, if applicable, is advantageous in the sense that such software has a better chance of knowing or predicting the total number of USSD messages that will follow, and their combined length. Alternatively, the software routine according the invention can be installed in the cellular telephone proper but the associated computer could give the software routine an indication that several USSD messages are likely to follow and the FACCH channel should be activated.

In the PLMN, the invention is preferably implemented in a more distributed manner. The logic for determining if multiple USSD messages will be needed must be placed near the actual application. Typical network elements for executing OTA and VAS applications include Mobile services Switching Centres, USSD centres, Home Location Registers and Visitor Location Registers of cellular communications systems and Service Control Points of intelligent networks. The logic for performing the unsuccessful call attempt, as described in connection with FIGS. 2 and 3, is preferably installed in a Mobile services Switching Centre. Other possible locations include a BTS (Base Transceiver Station), a BSC (Base Station Controller), and/or an RNC (Radio Network Controller).

The invention has been described, by way of example, in connection with the GSM cellular system (Global System for Mobile Communication). The invention is equally applicable in connection with the derivatives of GSM, such as DCS (also known as GSM 1800 and any digital mobile communications network supporting USSD transfer on a fast channel if a mobile station is in a call, and otherwise on a slow channel.

What is claimed is:

1. A method for performing a USSD transfer for transmitting data between two parties, namely a mobile station and a cellular communications network, wherein the USSD transfer takes place on a fast channel if the mobile station is involved in a call, and otherwise on a slow channel;

the method comprising:

determining the amount of data to be transmitted in the USSD transfer;

if the amount of data to be transmitted in the USSD transfer is likely to exceed a predetermined threshold, and if the mobile station is not involved in a call, directing the mobile station to call mode for performing the USSD transfer on the fast channel; and directing the mobile station into call mode by initiating a call attempt, wherein the party that initiates the USSD transfer also initiates the call attempt wherein the network, when initiating the USSD transfer, sends the mobile station an indication that the mobile station must initiate the call attempt, and wherein the mobile station, when initiating the call attempt, calls a non-existent number or itself.

2. A mobile station comprising:

means for performing a USSD transfer between itself and a cellular communications network, wherein the USSD transfer takes place on a fast channel if the mobile station is involved in a call, and otherwise on a slow channel;

a first logic for determining the amount of data to be transmitted in the USSD transfer;

a second logic initiating a call attempt for switching the USSD transfer to the fast channel if the amount of data to be transmitted in the USSD transfer is likely to exceed a predetermined threshold and if the mobile station is not involved in a call; and a third logic for directing the mobile station into call mode by initiating a call attempt, wherein the mobile station initiating the call attempt is adapted to receive an indication from a network that the mobile station must initiate the call attempt, and wherein the mobile station is adapted to call a non-existent number or itself when initiating the call attempt.

3. A mobile station according to claim 2, wherein the mobile station is adapted to initiate the call attempt before initiating the USSD transfer.

4. A mobile station according to claim 2, wherein the mobile station is adapted to initiate the call attempt after initiating the USSD transfer.

5. An arrangement for a cellular communications network, adapted for setting up USSD transfer for transmitting data between itself and a mobile station, wherein the USSD transfer takes place on a fast channel if the mobile station is involved in a call, and otherwise on a slow channel;

the arrangement comprising:

a first logic for determining the amount of data to be transmitted; and a second logic for initiating a call attempt for switching the USSD transfer to the fast channel if the amount of data to be transmitted in the USSD transfer is likely to exceed a predetermined threshold and if the mobile station is not involved in a call;

a third logic for directing the mobile station into call mode by initiating a call attempt, wherein the party that initiates the USSD transfer also initiates the call attempt, wherein the second logic is adapted to initiate a call attempt by sending to the mobile station an indication that the mobile station must initiate the call attempt, and wherein the mobile station is adapted to call a non-existent number or itself when initiating the call attempt.

* * * * *

UNITED STATES PATENT AND TRADEMARK OFFICE
CERTIFICATE OF CORRECTION

PATENT NO. : 6,834,196 B1
DATED : December 21, 2004
INVENTOR(S) : Teemu Tarnanen et al.

It is certified that error appears in the above-identified patent and that said Letters Patent is hereby corrected as shown below:

<u>Title page,</u>
Item [75], Inventors, replace "Sami Yliharjii" with -- Sami Ylaharju --.

Signed and Sealed this

Twenty-eighth Day of June, 2005

JON W. DUDAS
*Director of the United States Patent and Trademark Office*

UNITED STATES PATENT AND TRADEMARK OFFICE
CERTIFICATE OF CORRECTION

PATENT NO. : 6,834,196 B1
DATED : December 21, 2004
INVENTOR(S) : Teemu Tarnanen et al.

It is certified that error appears in the above-identified patent and that said Letters Patent is hereby corrected as shown below:

<u>Title page,</u>
Item [75], Inventors, replace "Sami Yliharjii" with -- Sami Yliharju --.

Signed and Sealed this

Twenty-first Day of March, 2006

JON W. DUDAS
*Director of the United States Patent and Trademark Office*